(12) United States Patent
Willcock

(10) Patent No.: US 8,751,430 B2
(45) Date of Patent: Jun. 10, 2014

(54) METHODS AND SYSTEM OF FILTERING IRRELEVANT ITEMS FROM SEARCH AND MATCH OPERATIONS USING EMOTIONAL CODES

(75) Inventor: Alex Willcock, West Sussex (GB)

(73) Assignee: Imagini Holdings Limited, London (GB)

( * ) Notice: Subject to any disclaimer, the term of this patent is extended or adjusted under 35 U.S.C. 154(b) by 747 days.

(21) Appl. No.: 12/353,988

(22) Filed: Jan. 15, 2009

(65) Prior Publication Data

US 2009/0125814 A1  May 14, 2009

Related U.S. Application Data

(62) Division of application No. 11/677,055, filed on Feb. 21, 2007, now Pat. No. 7,610,255.

(60) Provisional application No. 60/787,546, filed on Mar. 31, 2006.

(51) Int. Cl.
G06N 5/02 (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| 4,945,478 | A |  | 7/1990 | Merickel et al. |
|---|---|---|---|---|
| 5,219,433 | A |  | 6/1993 | Zaruba et al. |
| 5,668,965 | A |  | 9/1997 | Matsumoto et al. |
| 5,754,939 | A | * | 5/1998 | Herz et al. .................. 455/3.04 |
| 6,029,195 | A |  | 2/2000 | Herz |
| 6,189,029 | B1 |  | 2/2001 | Fuerst |
| 6,219,657 | B1 |  | 4/2001 | Hatayama |
| 6,658,391 | B1 |  | 12/2003 | Williams et al. |
| 6,826,540 | B1 |  | 11/2004 | Plantec et al. |
| 7,080,027 | B2 | * | 7/2006 | Luby et al. .................. 705/7.31 |
| 7,137,006 | B1 | * | 11/2006 | Grandcolas et al. .......... 713/180 |
| 7,228,283 | B1 |  | 6/2007 | Hornstein |
| 7,263,489 | B2 |  | 8/2007 | Cohen |
| 7,356,470 | B2 | * | 4/2008 | Roth et al. .................... 704/270 |

(Continued)

FOREIGN PATENT DOCUMENTS

| WO | WO 99/60503 | 11/1999 |
|---|---|---|
| WO | WO 01/06441 | 1/2001 |

OTHER PUBLICATIONS

"Parallel K-means Clustering Algorithm on NOWs", S. Kantabutra, A. L. Couch, Department of Science, Tufts University, Medford, MA 02155, Nectec Technical Journal, vol. 1, No. 6, Jan.-Feb. 2000, pp. 243-248.*

(Continued)

*Primary Examiner* — Kakali Chaki
*Assistant Examiner* — Mai T Tran
(74) *Attorney, Agent, or Firm* — EAGLE IP Ltd.; Jacqueline C. Lui

(57) ABSTRACT

A method and system for filtering irrelevant items using machine-readable emotional codes from a plurality of database entities is disclosed. The entity can be a human user, a product, or a service. The emotional codes are category labels out of a plurality of categories and the plurality of categories are generated by categorizing user responses. After understanding the sending parties' emotional profile, the receiving party can filter irrelevant items to achieve more optimum results.

20 Claims, 12 Drawing Sheets

(56) References Cited

U.S. PATENT DOCUMENTS

| | | |
|---|---|---|
| 7,444,308 B2 * | 10/2008 | Guyon et al. .................. 706/12 |
| 7,707,171 B2 | 4/2010 | Willcock |
| 7,739,140 B2 | 6/2010 | Vinson et al. |
| 7,966,305 B2 | 6/2011 | Olsen |
| 8,200,504 B2 | 6/2012 | Williams et al. |
| 2001/0007100 A1 | 7/2001 | Revashetti et al. |
| 2002/0016731 A1 | 2/2002 | Kupersmit |
| 2002/0052774 A1 | 5/2002 | Parker et al. |
| 2002/0103786 A1 | 8/2002 | Goel |
| 2002/0152110 A1 | 10/2002 | Stewart et al. |
| 2003/0046140 A1 | 3/2003 | Callahan et al. |
| 2003/0063779 A1 | 4/2003 | Wrigley |
| 2004/0101212 A1 | 5/2004 | Fedorovskaya et al. |
| 2004/0210661 A1 | 10/2004 | Thompson |
| 2004/0230989 A1 | 11/2004 | Macey et al. |
| 2005/0079474 A1 | 4/2005 | Lowe |
| 2005/0223237 A1 | 10/2005 | Barletta et al. |
| 2005/0234972 A1 | 10/2005 | Zeng |
| 2005/0253554 A1 | 11/2005 | DiFazio et al. |
| 2007/0067273 A1 | 3/2007 | Willcock |
| 2007/0206606 A1 * | 9/2007 | Coleman et al. ......... 370/395.52 |
| 2008/0040473 A1 | 2/2008 | Larsson et al. |
| 2009/0028183 A1 | 1/2009 | Landers et al. |
| 2009/0270170 A1 | 10/2009 | Patton |

OTHER PUBLICATIONS

Oge Marques et al, "Content-Based Visual Information Retrieval", Florida Atlantic University, USA, Jan. 31, 2002, pp. 37-58.

Nicu Sebe et al, "Mutimodal Emotion Recognition", Jun. 18, 2004, pp. 1-23 Handbook of Pattern Recognition and Computer Vision, World Scientific.

Kohda Y et al: "Ubiquitous advertising on the WWW: Merging advertisement on the browser", Computer Networks and ISDN Systems, North Holland Publishing.

* cited by examiner

METHODS AND SYSTEM OF FILTERING IRRELEVANT ITEMS FROM SEARCH AND MATCH OPERATIONS USING EMOTIONAL CODES

CROSS-REFERENCE TO RELATED APPLICATION

This application is a divisional application of U.S. Non-provisional application having an application number of Ser. No. 11/677,055 filed on Feb. 21, 2007 now U.S. Pat. No. 7,610,255, which claims benefit under 35 U.S.C. §119(e) of U.S. Provisional Application having Ser. No. 60/787,546 filed Mar. 31, 2006, which is hereby incorporated by reference herein in its entirety. No new matter has been added.

FIELD OF INVENTION

The present invention is related to a computerized searching and matching system, and in particular a searching and matching system that is customized to make use of the user's emotional profile.

BACKGROUND OF INVENTION

In conventional text-based computerized searching and matching systems, a user needs to specify a text string as matching criteria to perform a searching and matching operation. Since it requires users to exercise their logical thought process to input the search criteria precisely, this kind of searching and matching systems is only effective in retrieving the factual information from users. It is not effective in capturing users' emotional reflex. However, it is well observed that humans make snap judgments based on instinctive emotional inclination. Unfortunately, there is a severe limitation in expressing the user's emotional reflex to conventional searching and matching systems in an intuitive manner, As a result, the system may not return meaningful matching results to the users.

SUMMARY OF INVENTION

In the light of the foregoing background, it is an object of the present invention to provide an alternative computerized system that can capture the emotional profiles of users and use such profiles to assist in searching or matching operations. This system may also be applied for searching and matching between different entities, where an entity can be a human being, a product or a service.

Accordingly, the present invention, in one aspect, is a method of codifying human emotion into a machine-readable language by a first computer application. This method first creates a multimedia object for each entity. It then presents those multimedia objects for users to select. When users make the selection, they implicitly reveal their emotional preferences. Such human emotion preferences are then captured and categorized into categories. Each of these categories is assigned an emotional code in a machine readable language. In so doing, user's emotional preference may be digitally characterized and conveyed to a second computer application; and the second computer application can then adapt its operation based on the interpretation of the emotional code. This operation may be a search operation, a match operation, an operation to find items with similar emotional code, an operation to find dissimilar emotional code, or any combination thereof.

In a preferred embodiment of the present invention, the multimedia objects are digital images. These multimedia objects are also attached with a plurality of keywords; with each keyword describing the human feeling towards that multimedia object.

In another preferred embodiment, the user response may comprise positive or negative responses from the user; as well as the comments that the user makes on those responses.

In one implementation, the categorizing step comprises the steps of (a) retrieving user responses from said user; (b) compiling a list of keywords aggregated from the multimedia objects that the user selected; (c) tallying up the number of occurrences of each keyword on a list of keywords and (d) invoking an expert system that categorizes this user to at least one category based on the result of step (c) and other relevant information of user's responses. In one embodiment of this implementation, the expert system is a rule-based expert system that captures the expertise of a psychologist when he categorizes the user based on the user's responses. In an alternative embodiment, this expert system is a neural network classification system that classifies the user responses into said categories.

In another implementation, the categorizing step invokes a statistical cluster analysis module to categorize a plurality of user responses into at least one cluster. Each cluster has a cluster mean parameter and a cluster variance parameter. And each cluster is assigned an emotional code.

In yet another implementation, this invention further comprises a method of associating an emotional code to an entity, which can be either the products or services that an enterprise is offering. This associating method first selects a plurality of representative multimedia objects from a pool. Each of them is pre-selected to represent a broad category of human emotion and is assigned at least one emotional code. Then for each entity, an entity multimedia object is created. This can be, for example, a digital image of that entity. Next, the plurality of representative multimedia objects and the entity multimedia object are displayed on a display device for a second user to operate. When the second user selects among the plurality of representative multimedia objects a first representative multimedia object that is most similar to that entity object; the emotional code pre-assigned to the first representative multimedia object is transfer to that entity and hence the entity inherits that emotional code.

In a variation of the above method, this invention further comprises a search step for the enterprise to present a filtered plurality of entities to a third user when the third user chooses to reveal his emotional code to the enterprise. The search step first defines a peripheral region centered around the third user's emotional code. It then selects a plurality of entities having emotional code falling within the peripheral region and then presents them to the third user as the filtered plurality of entities, so that irrelevant entities whose emotional code does not remotely match third user's emotional code will not be presented to him.

In a preferred embodiment of this aspect of the present invention, and when the categorizing step invokes a statistical clustering module to categorize a plurality of user responses into at least one cluster so that each cluster is characterized by a cluster mean parameter and a cluster variance parameter, the peripheral region can be created so that it is centered at the cluster mean parameter; and the extent of this region is a proportional constant multiplying the cluster variance parameter.

According to another aspect of the present invention, a system for codifying human emotion into a machine readable language is disclosed. The system comprises a profiling server, an enterprise system, an end-user system and a search and match engine. The profiling server is configured to (a) capture the emotional preferences from a plurality of users; (b) generate emotional codes from the emotional preferences; and (c) generate a plurality of representative multimedia objects, each of which is associated with at least one emotional code. The enterprise system has a product or service catalog and each of the products or services is tagged with an emotional code. (Detailed description of how this is done will be given later). The end-user system is capable of receiving the user's emotional code from the server. The search and match engine is configured to receive the user's emotional code from the end-user system and the product or service emotional code from the enterprise system so that it can retrieve a plurality of products or services of which their emotional codes proximate the user's emotional code.

In one embodiment, the enterprise system and the search and match engine run on the same computer system. Whereas in another embodiment, the profile server and the search and match engine is hosted in the same computer system.

In a preferred embodiment, the end user system is capable of running an Internet browser application and the emotion code is transmitted to the end user system in the form of a computer cookie file.

There are many advantages to the present invention. A primary advantage is that it can capture the emotional reflex of a user, something that cannot be done by conventional text-based questionnaires, and use this emotional profile to improve search precision. It is well known in the art that consumers make snap judgment decision in their buying habits. Such decision is largely based on their instinctive emotional preferences rather than a logical, analytical thought process. Before this invention, there are no effective and efficient methods to codify human emotional preference to a computer. But through this invention, the emotional dimension of human preferences can now be effectively captured and conveyed just like other rational information. The emotional profiling methodology therefore provides additional insight for market researchers to understand the behavior of the consumers. Such insights cannot be obtained by conventional text-based surveys.

Another advantage of the present invention is that when all users and objects are tagged with their respective emotional code, it allows market researchers to perform targeted marketing in the emotional space. The emotional code can become a universally accepted vocabulary of communication in that space. As such, this invention makes it possible for human emotional feelings and preferences to be communicated digitally across cyber-space, so that commerce can zoom into what the consumer actually likes immediately. Similarly, users can also find like-minded users easily.

DETAILED DESCRIPTION OF THE PREFERRED EMBODIMENTS

As used herein and in the claims, "comprising" means including the following elements or steps but not excluding others. Moreover, "entity" includes both a living being such as a user, and an entity object. The term "entity object" is used herewith to denote a non-living entity such as but not limited to a company, a corporation, a product, a service, a brand, a concept such as 'holiday', or scenery. And the term "multimedia object" refers to a multimedia data structure that represents the entity in the computer system. It can be, but not limited to, a digital image, a video clip, a sound file, or a text-based object. Moreover, the terms "emotional code", "Visual DNA" and "emotional fingerprint" are used interchangeably in this document and they all mean a machine-readable code that codifies human emotion.

Figure 1:
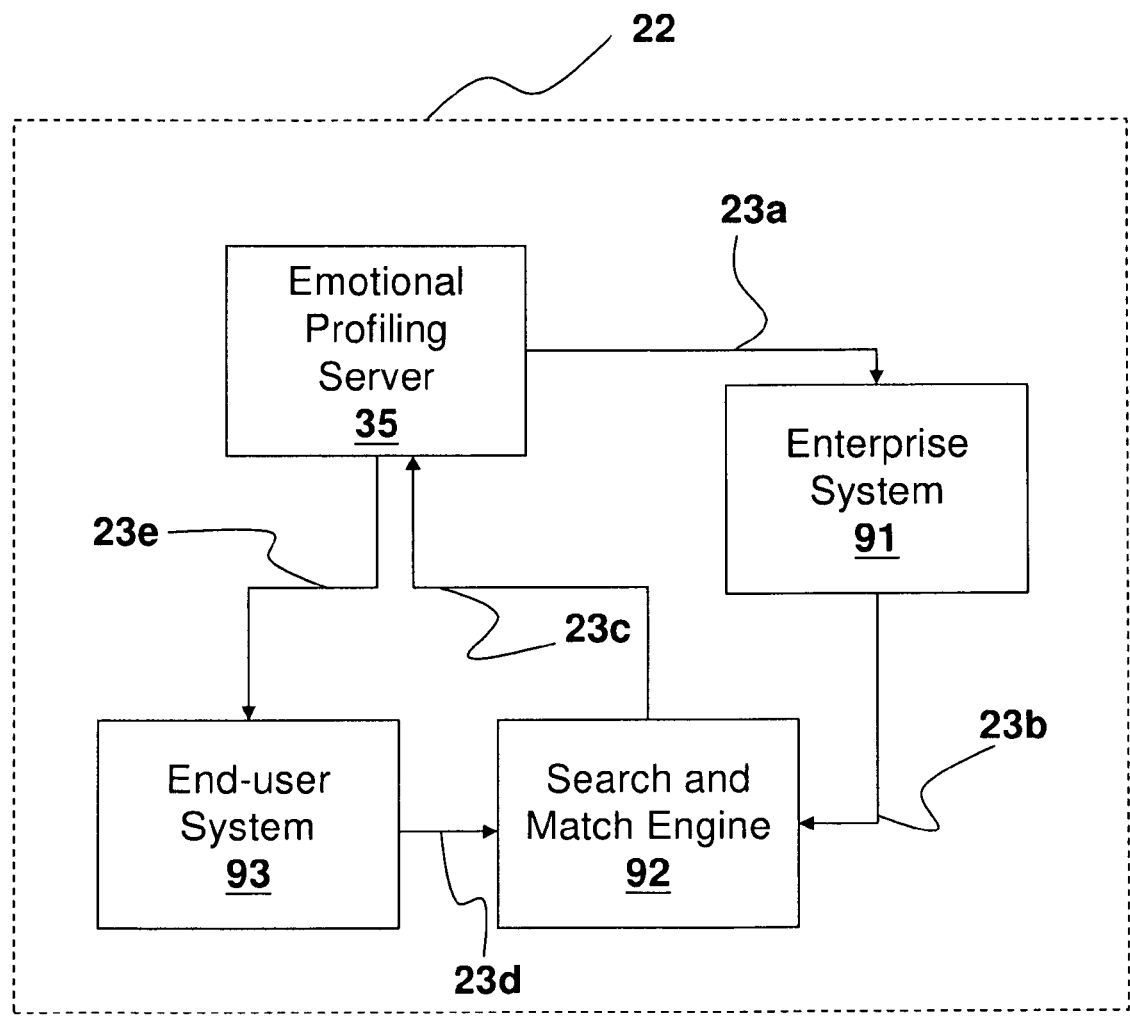
FIG. 1 is the block diagram of the emotional profiling system in one embodiment.

Referring now to FIG. 1, the first embodiment of the present invention is an emotional profiling system (22) comprising multiple subsystems, which include a computerized emotional profiling server (35), at least one enterprise system (91), at least one search and match engine (92) and at least one end-user system (93). These subsystems are each connected to the computerized emotional profiling server (35) via different data communication channels (23a, 23b, 23c, 23d and 23e). These data communication channels establish point to point data path between the two parties. This can be done either through a private communication network, a public network such as the Internet, or a virtual private network (VPN). It may traverse one or more local area network (LAN), metropolitan area network (MAN), wide area network (WAN), or a combination thereof. Each of such networks may be implemented using leased lines, optical fiber, wireless technologies, or other networking technologists.

Figure 2:
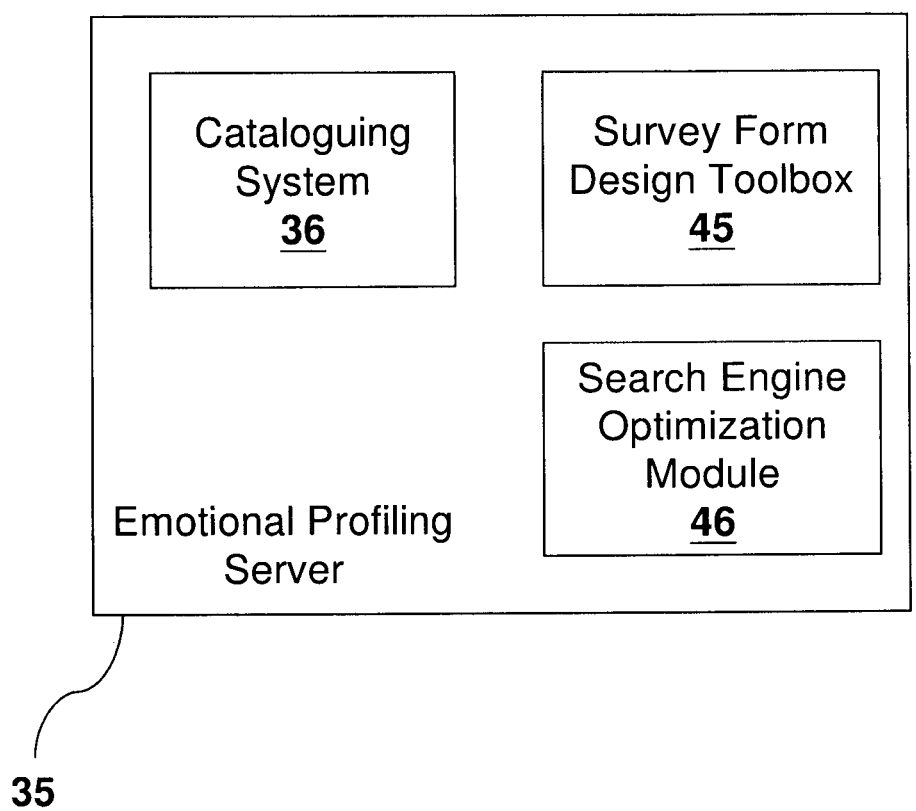
FIG. 2 is the block diagram of the computerized emotional profiling server according to one example of the present invention.

In FIG. 2, the internal structure of the computerized emotional profiling server (35) is revealed. It further comprise (a) an emotional profile cataloguing system (36) that sends out emotional survey forms to users, collects and categorizes the survey results and assigns emotional code to different emotional categories; (b) a survey form design toolbox (45) that allows a designer to design a customized survey form quickly; and (c) a search engine optimization module (46). This module can be embedded to the search and match engine (92) so that the latter can make use of the emotional code to retrieve items that closely matches user's emotional preference.

Figure 3A:
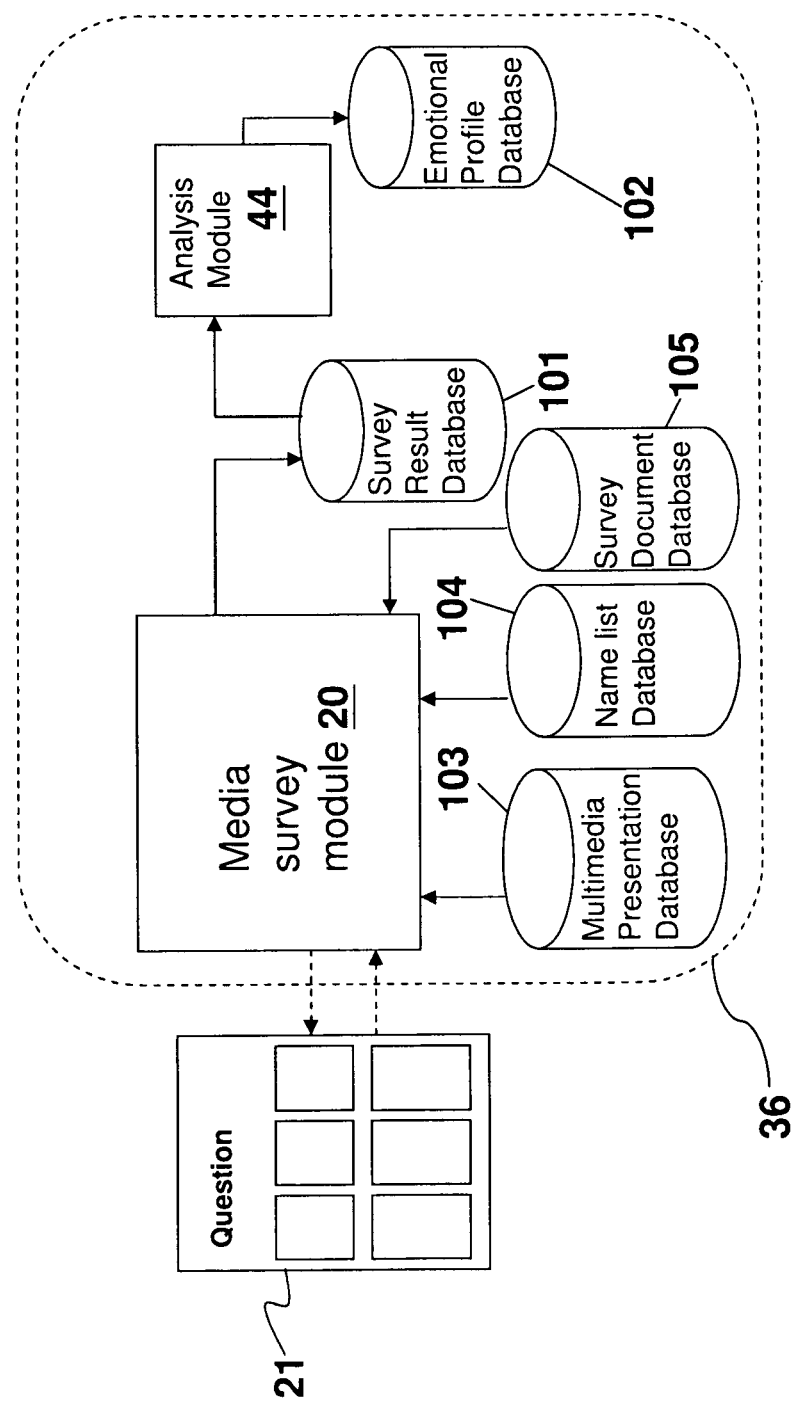
FIG. 3a shows the major software modules and databases of the emotional profile cataloguing system.
Figure 3B:
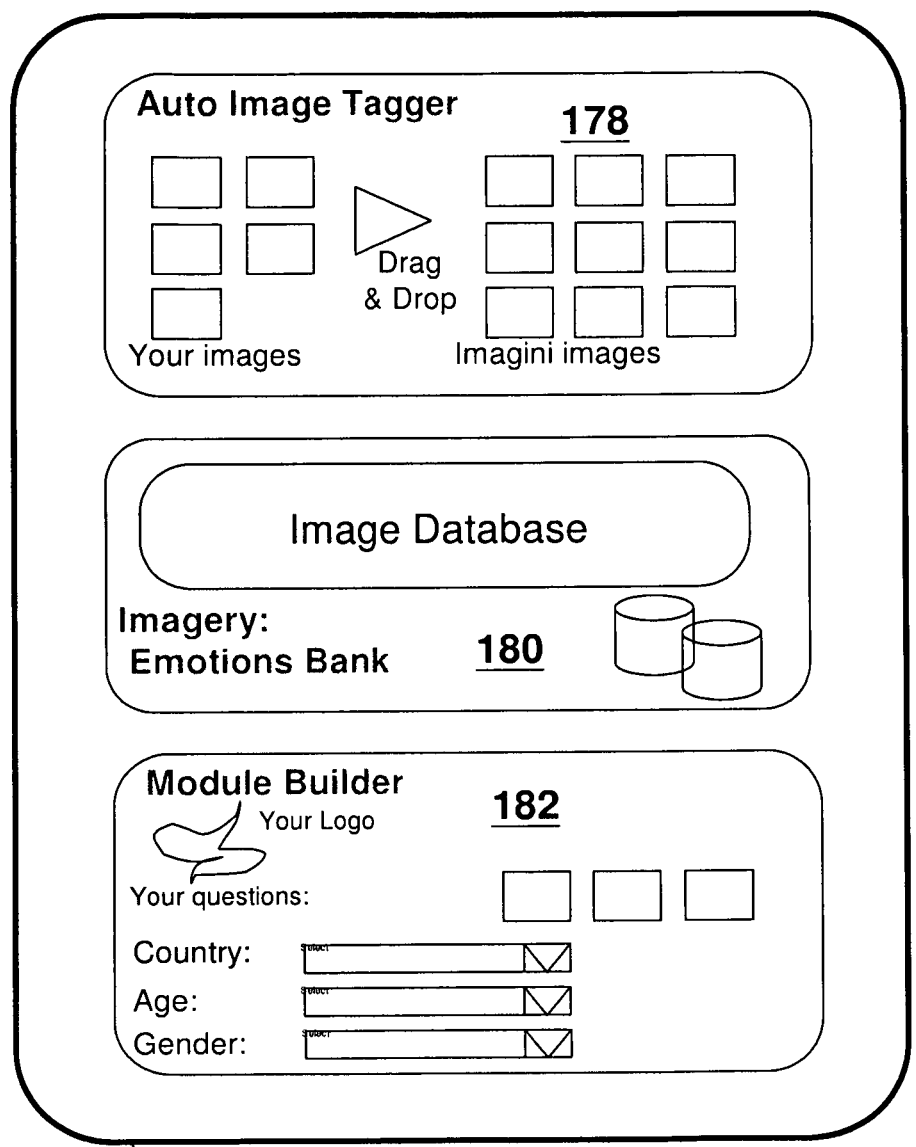
FIG. 3b shows the internal composition of the survey form design toolbox.

FIGS. 3a and 3b further illustrates one implementation of the emotional profile cataloguing system (36) and that of the survey form design toolbox (45) respectively. This cataloguing system (36) makes use of the media survey module (20), the analysis module (44), and a plurality of databases including the survey result database (101), the emotional profile database (102), the multimedia presentation database (103), the name list database (104) and the survey document database (105). The media survey module (20) sends out survey forms (21) to users. The survey result database (101) stores the survey results from the media survey module (20) and sends them to the analysis module (44). The latter in turn connects to emotional profile database (102). The survey form design toolbox (45) consists of three parts. They are auto image tagger (178), the image database (180) and the module builder (182) as shown in FIG. 3b. The details of these systems will be elaborated later.

The system architecture of the first embodiment of the present invention is thus described. Now the description will turn to the operation of the multiple subsystems, and how they interact with each other to achieve the object of the present invention.

Return back to FIG. 1, the computerized emotional profiling server (35) sends a set of data packages which is called the Insight packages in this specific example to those enterprise systems (91) that subscribe to its service via the data communication channel (23a). Each Insight package stores the analyzed results of user's emotional information, a set of representative multimedia objects and the associated emotional codes. Using the Insight packages, the staff at the enterprise can gain a better understanding of users' preferences. Next, the enterprise system (91) will tag their products or services with the emotional codes (This will be explained in more detailed later), and then send the product or service information, together with its emotional code to a search and match engine (92). Meanwhile, the computerized emotional profiling server (35) may also distribute the user's emotional code as well as information unique to this user back to the user in the form of a 'know-me' packet to an end-user system (93) owned by the user via another data communication channel (23e).

In one specific example of the emotional profiling system (22), the user is a consumer, the enterprise system is an on-line shopping site, and the search and match engine is provided by a third party commerce system. The consumer, through the end-user system (91), connects to the commerce system hosting the search and match engine (92) via the data communication path (23d); and the merchandiser makes use of the enterprise system (91) to offer his product or service information to the commerce system via another data communication path (23b). Through the commerce system, the consumer can select what product or service to purchase. As mentioned before, each product or service can be tagged with an emotional code. When the consumer also reveals his emotional code to the commerce system, the commerce system can select those products from the merchandiser's enterprise system (91) that matches the consumer's emotional code, thus providing the consumer their mostly desired products. In so doing, targeted trading between merchants and consumers can be facilitated. Furthermore, the commerce system may also record the choices that the consumer has selected from the plurality of products or services presented to him, and send this information back to the computerized emotional profiling server (35) for subsequent 'click-through' analysis. This is done via another data communication path (23c).

Survey Form Generation and Processing

Figure 4:
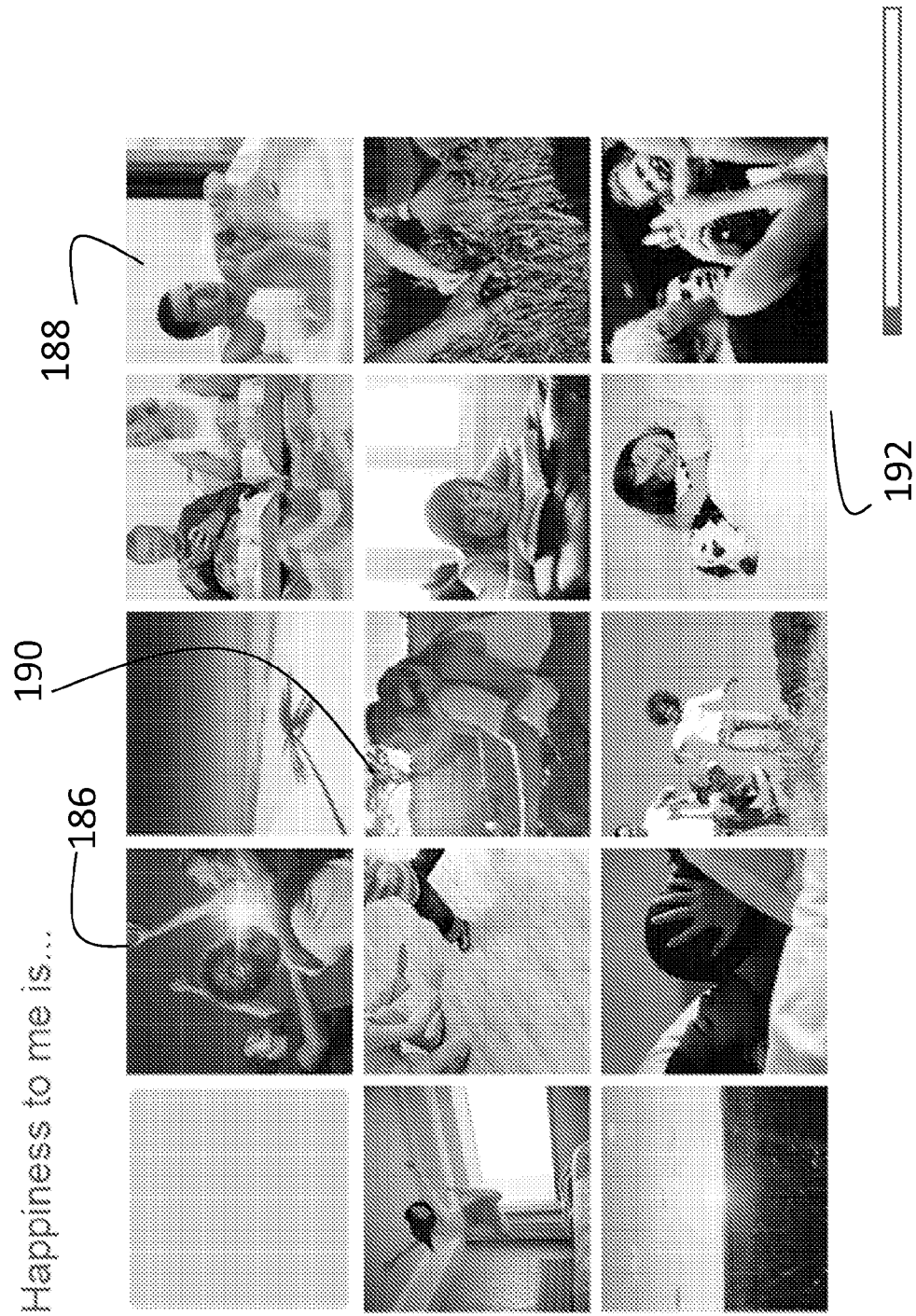
FIG. 4 illustrates a specific example of the user interface when the user is doing the survey.

Turning now to FIG. 3a, where the internal structure of the emotional profile cataloguing system (36) is shown. As described previously, the cataloguing system (36) sends out emotional survey forms to users, collects and categorizes the survey results and assigns emotional code to different emotional categories. More specifically, the cataloguing system (36) sends out a survey form (21) to a user and prompts the user to choose one or more answers. The survey form (21) comprises at least one question together with a plurality of multimedia objects. The multimedia object can be but is not limited to a textual object, an image, photograph, picture, audio clip, sound clip, movie, or any combination thereof. In a preferred embodiment, the survey form is displayed on the web browser of the user's computing device. A typical web browser is Internet Explorer from Microsoft. FIG. 4 shows one example of a survey form whereby the multimedia objects are digital image. In yet another preferred embodiment, the image is a mouse-clickable object so that when the user clicks on a particular image, the web-browser detects which image the user has chosen and sends this information back to the media survey module (20) as the user's choice of that survey question.

The survey document database (105) comprises a plurality of survey forms. The survey form may be entirely text-based (i.e. the multimedia objects are text objects). This kind of survey form is to record the factual and demographic information about the users such as their sex, age range, income level and the likes. This is the traditional survey questionnaire. An important aspect of the present invention is not only to gather demographic information from the user but also his emotional preferences. Hence in a typical survey document, the survey forms comprise not only pure text-based forms but also forms with rich multimedia objects such as the one shown in FIG. 4. Research has shown that when pure text-based questionnaires are presented to a user, the user will go through a 'considered thought process' to read up the multiple choice answers before he selects the one that is applicable to him. However, it is well known that feelings drive a vast majority of human behavior and choices, and how people feel in the test environment is closer to how they would feel and act in real-life. These kinds of inner feelings can better be captured by user's direct emotional response to visual stimuli. Hence a survey form comprising a plurality of images or visual objects can capture the emotional reflex of the user that can not be done by conventional text-based questionnaires. Recent experimental result showed that the number of people willing to respond to a multimedia questionnaire was almost three times higher than answering a traditional text-based questionnaire. More importantly, new consumer segments were found in the multimedia survey that would not have been uncovered by a traditional text based survey.

An exemplary implementation of generating the survey forms and conducting the survey is given here. Firstly, appropriate multimedia objects are chosen to build survey forms. In a preferred embodiment, these multimedia objects are images which are extracted from an image database. This image database can be a private collection, public database, or commercial database. An example of a commercial image database is Gettyimages®. Each image is tagged with a set of keywords. These keywords are carefully selected to describe the human's view and feeling towards that image. An exemplary set of keywords are beach, snow mountain, metropolitan area, natural setting; or classical, romantic, traditional, trendy, etc. In one embodiment, this is done manually by humans. In a preferred embodiment, it is done by psychologist experts. In another embodiment, this process can be performed by a computer module, the details of which will be discussed later.

In this exemplary implementation, a suite of survey forms are created, each for a different domain. For example, there is one survey form for sports, another one for travel, etc. Each survey form comprises multiple survey pages. Some of the survey page captures the factual information of a user and they are the traditional text-based survey page. Other survey pages comprise a textual question, and multiple images that are tagged with keywords for the user to choose from.

Afterwards, the survey forms are to be sent out to a plurality of users to fill out. In one implementation, the list of users can be acquired from various name-list databases (104) that contain the contact information or email addresses of the users. This can be a company's name-list database, an advertising company that sells commercialized name-list database, user communities like interests clubs or professional organizations, or online communities such as Yahoo or MSN group. To achieve unbiased survey results, the more users participating in the survey, the more reliable the survey statistics will be. On the other hand, the pool of users from the name-list database (104) can be partitioned into many groups with different classifications. For example, the users can be divided into groups according to ethnical origins, different races, geographical territories, culture or languages, etc. Hence the same survey may be conducted on different user groups. Though the size of each group may not be as big as a large pool, the group so partitioned may have certain common characteristics, and hence it may yield more refined and meaningful emotional profiles as compared to the survey results from a large user pool.

Figure 5:
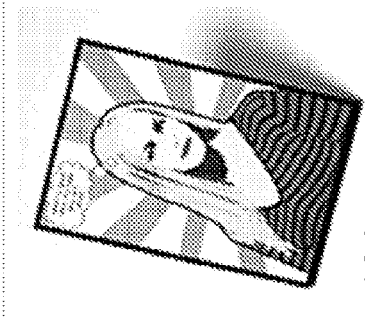
FIG. 5 shows another specific example of the user interface when the user is doing the survey.

When a user responds to the survey question by choosing visually the most desirable image from a plurality of alternatives, the system also records the keywords associated with the selected image for subsequent analysis. As the keywords to each image are invisible to the user, what he selected is a full reflection of his emotional preference on that subject. Referring to FIG. 4 as a specific example for illustration, the question on "Happiness to me is . . . " shows a number of images to the user such as praying under the sun (186), relaxing in the bathtub (188), taking a ride through the countryside (190), or sleeping with a pet (192). If the user selects "relaxing in the bathtub" (188) image for instance, he has indirectly selected several keywords such as quiescence, warmth and indoor that have been associated to this image previously. Nonetheless, the survey results to be transmitted are not the keywords but just the simple selection the user made to the images, as the extraction and analysis of keywords associated with selected images is done in the emotional profiling server (35). Moreover, there is a chance that the user dislikes some of these images. In one implementation, a 'remove' button (194) for each item as shown in FIG. 5 is also provided for user to express his negative feeling towards this image. This negative feedback is equally as important as his positive selections and will also be saved as part of the survey results for subsequent analysis.

During the survey, the system also provides means to let the user write comments about what and why he likes and dislikes about the images. These comments are also saved as part of the survey record and may be used by the analysis module to determine the most appropriate emotional code for this user. The comments will also be added to his survey results.

In addition to capturing user's emotional preference by asking him to go through the entire survey form explicitly, it may also be possible to do so implicitly when he is browsing the Internet. In a specific embodiment when the user is visiting an on-line shopping site, what product/service the user clicks on the on-line product/service catalog also reveals his emotional preference. Such information can be captured by the system and store in the user's survey record for further analysis.

Last but not least, the system also provides the users the facility to invite their friends to join a user group and answer the survey questions. They can invite their friends to join the group through websites, email, blog, podcasting, or any other means available in online social networks. This kind of 'viral effect' can greatly extend the user survey pool.

Analysis of Survey Results

After all the survey result records from the user community have been collected, the emotional profile cataloguing system (36) can invoke the analysis module (44) to analyze them. In general, the survey result record has a complex data structure in order to store the multi-facet demographic data and emotional preferences of the user in a multi-dimensional data representative. For example, it may be implemented as a high dimensional matrix, a tree structure or an object-oriented data type. In one implementation, it comprises a vector that records the demographic data of the user, a multi-dimensional matrix that records his emotional preferences, and text fields that record the positive and negative comments from the user. The multi-dimensional matrix may further comprise the choice vector that registers the choices made by the user. It may further comprise the speed vector to record the time it takes for the user to make that choice(s) and the sequential ordering vector that registers the ordering of choices if the user selects more than one choice for a question.

Having obtained the survey results stored in a multi-dimensional data representative from the survey result database (101), the analysis module (44) can now perform two kinds of analysis that assign users to different emotional code categories. The first type of analysis is keyword analysis which can be done manually or automatically. Keyword analysis is to analyze the keywords associated with the image selected by the respondent, and deduce which category this user should be assigned to. In one implementation, the keyword analysis module reads the chosen images stored in the survey result, and finds the keywords from a database associated with each image. It then aggregates them into a keyword list. In a specific implementation, this analysis is performed by psychologist experts. The experts can study the keyword list, the number of occurrences of each keyword in the list; the positive and negative comments entered by the user, and then determine the emotional code of this user.

In another implementation, this analysis is done automatically by a computer module. As a specific illustrative example, the user has answered thirteen questions in a survey. The keyword "sunshine" appears five times, and is the predominant keyword. Though the keyword "sad" also appears once, the module weights in all the evidence and assigns this user to the "optimist" emotional code category. Alternatively, other Artificial Intelligence techniques can also be employed. Specifically, when a psychology expert articulates the reasons why he assigns a user a certain emotional code after studying the user's survey record, those reasons can be encoded to a rule-based expert system so that the latter can draw the same conclusion. Alternatively, after a large number of users have been categorized, a neural network classifier can be used to learn this categorization mapping. In this case, the keywords tallying up from the user's survey result are fed to the input nodes of a neural network, and the output nodes are set to the particular emotional code that this user is assigned to. The neural network training algorithm is then invoked to learn the associative mapping of this past example. After training, the neural network can then be used to assign the emotional code to a new user when his keyword list is available.

In any case, the emotional code, together with the keyword statistics, and all other relevant information are stored as an emotional profile record for this user in the emotional profile database (102).

The second analysis method is a statistical clustering technique that performs clustering analysis on these multi-dimensional vectors. As a typical example, this module can invoke the SPSS statistical package from SPSS Inc. The cluster analysis module produces at least one cluster from the survey results; and also the statistics associated with this cluster.

In operation, the statistical analysis module retrieves all the survey result records from the survey result database (101) and segregates them into clusters or emotional profile categories. Each cluster is represented by a cluster center with its cluster statistics such as the cluster mean and variance. The cluster mean is represented by a multi dimensional vector while the cluster variance is a multi-dimensional matrix. This clustering statistics, together with the emotional code, and all other relevant information related to this emotional profile category are stored as an emotional profile record in the emotional profile database (102).

After keyword or cluster analysis, users in the same emotional profile category can then be assigned to the same emotional code. This code becomes the personal emotional code for this segment of users. As it denotes the emotional preference of the user, it is also referred as his Visual DNA, or emotional fingerprint. It is advantageous to use an easy-to-remember name or image to denote the emotional code for future references. For example, the names 'traditionalist', 'modernist' and 'environmentalist' can be used. This can become the international emotional code; and when this emotional code is adopted worldwide, it can greatly improve the efficiency of the consumer/commerce communication as will be seen by way of examples in subsequent paragraphs. Alternatively, a numeric code can be adopted. For example, each cluster can simply be referred by a cluster number.

Figure 6:
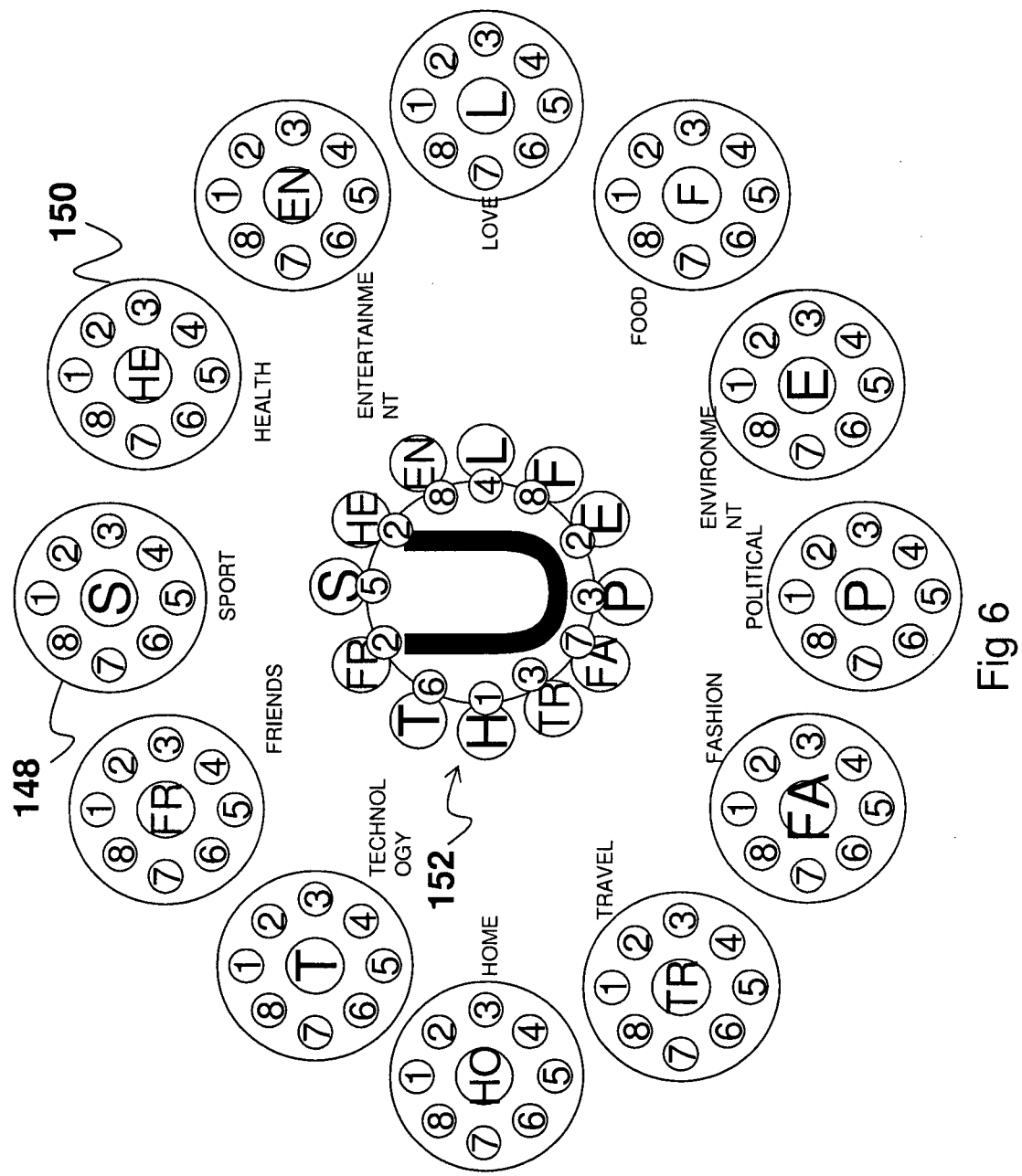
FIG. 6 is the illustration of a specific data representation example of the emotional code or Visual DNA.

A specific data representation example of the emotional code or Visual DNA is illustrated in FIG. 6. The emotional preferences of a user are divided into twelve alternative tags to one of which the user belongs. For instance if he likes basketball in Sport domain, he belongs to Tag 5. And if he prefers herbal medicine, then he belongs to Tag 2 in the Health domain. The analysis module (44) is able to assign a code to this user because the user has completed the surveys for these two domains. Hence if he completes all surveys for all twelve domains, then his emotional code or Visual DNA code (152) would be a text string of eight entries, i.e. "S5 HE2 EN8 L4 F8 E2 P3 FA7 TR3 H1 T6 FR2" as shown in FIG. 6. On the other hands, if the user only completes a subset of survey forms, his visual DNA code will only consist of codes from those domains that have data on his emotional preferences.

In FIG. 6, an example having twelve domains and eight tags in each domain is used to illustrate a specific data representation of the Visual DNA. It should be emphasized that this inventive system can cater for any number of domains and any number of tags within each domain. Hence the specific numbers mentioned should not be construed as the only numbers required in the implementation of this invention.

Survey Form Design Toolbox

As briefly introduced before, the survey form design toolbox (45) facilitates the generation of survey documents. Referring back to FIG. 3b, in one implementation the toolbox (45) consists of three modules. The first module is the image database (180) from which images for a survey question can be extracted for use. A typical commercial image database is Gettyimages®. The second essential part of the toolbox (45) is an auto image tagger (178) that assigns keywords to images in a simple and intuitive manner. Its detailed operation will be discussed in the following paragraph. The third module is the module builder (182) which assists a survey designer to compose a survey document consisting of a plurality of survey pages, each of which comprises a question and multiple image or text objects for users to choose. It may also provide facility for the designer to incorporate additional information such as company logo or other relevant data to the survey document.

Figure 7A:
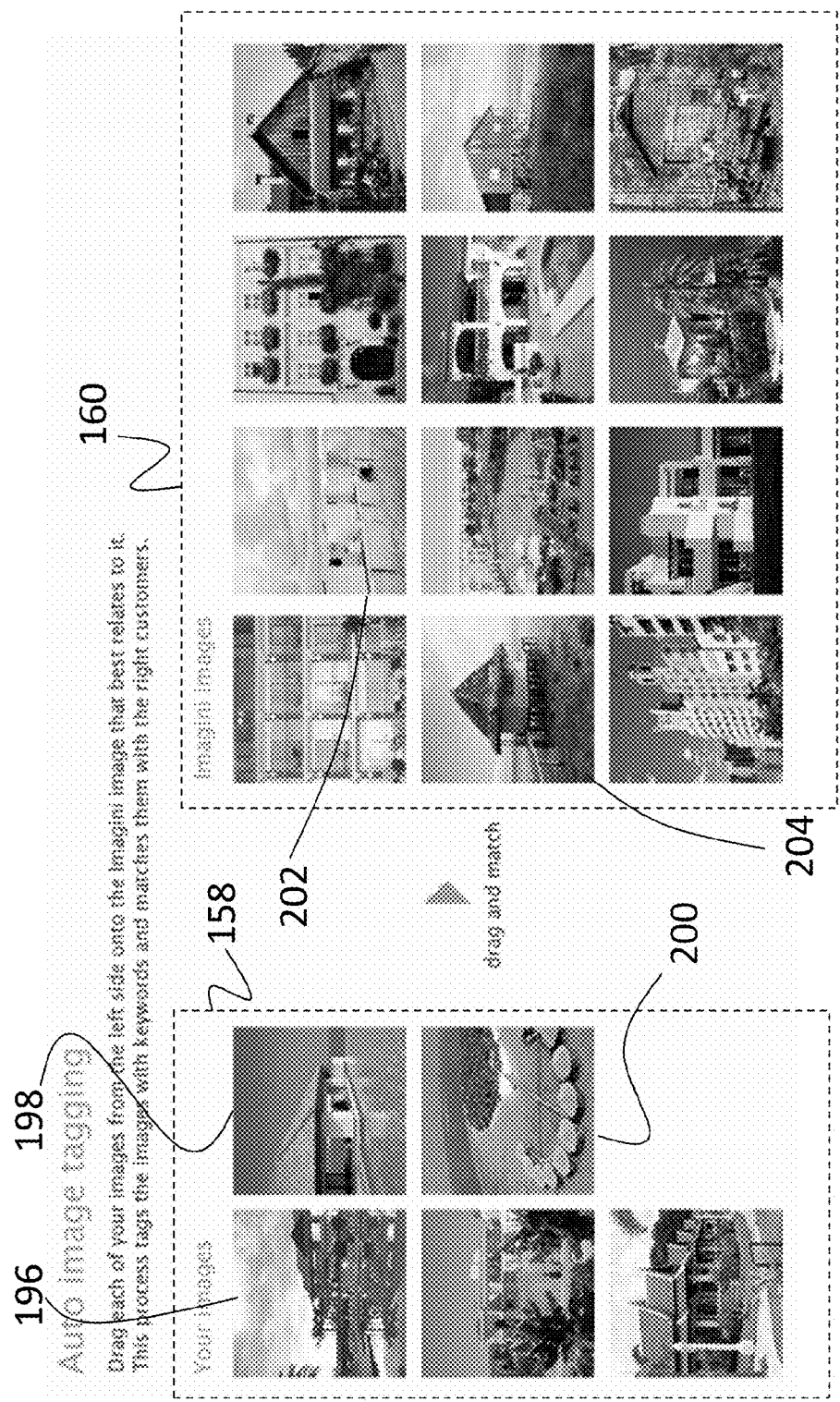
FIG. 7a is a specific example of auto image tagger, where tagging has not been done yet.
Figure 7B:
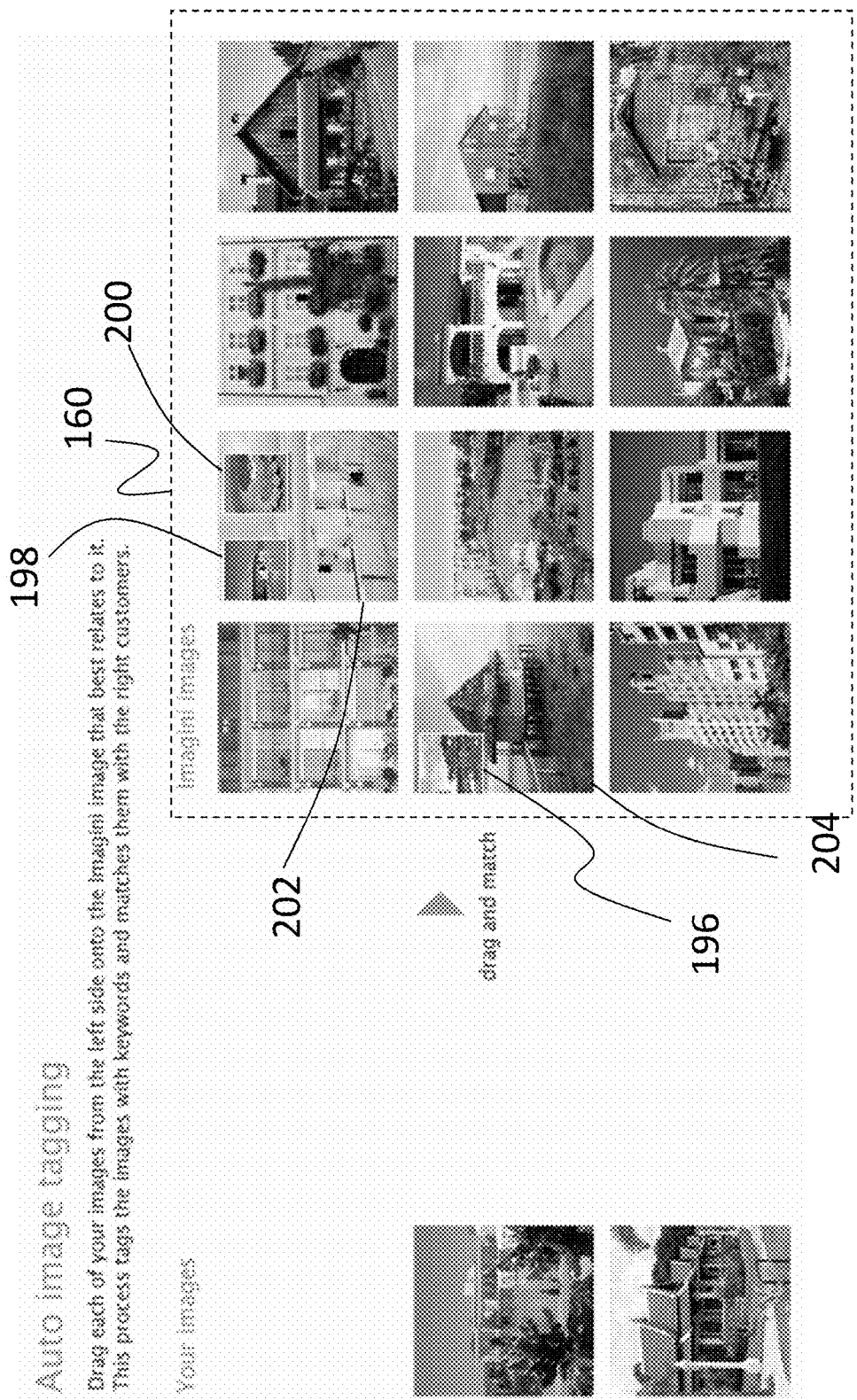
FIG. 7b is the specific example of auto image tagger, where tagging is partially done.

An exemplary computer screen layout of the auto image tagger is shown in FIGS. 7a and 7b. The auto image tagger interface screen comprises two panels: the untagged image panel (158) and tagged image panel (160). As its name implies, the former contains images not tagged with keywords while those in the later panel are tagged. To assign keywords to those untagged images, a user simply compares an untagged image against all those in the tagged image panel, and identifies the most similar one. He then uses a computer mouse to drag the untagged image onto that most similar one in the tagged image panel. In FIG. 7a, for instance, the first image (196), the second image (198) and the third image (200) are residing in the untagged image panel (158); and images (202) and (204) are standard images tagged with keywords. Then the user drags the second picture (198) and the third picture (200) onto a first standard image (202), whereas the first picture (196) is dragged onto a second standard image (204). The newly tagged images (196), (198) and (200) in FIG. 7b will become smaller in size and reside on the corresponding tagged images in the tagged images panel (160). By so doing, the untagged image will inherit those keywords from the tagged image.

End User System (93)

After a new user is assigned an emotional code or Visual DNA code, the computerized emotional profiling server (35) creates a 'know-me' package for the user. The package includes the emotional code assigned to this user by the server (35), his comments on the images he selected or removed, his personal information or hobbies, his network of friends . . . etc. The server (35) can send this 'know-me' package to the user's end user system (91). In one implementation, the 'know-me' package can be in the form of a 'cookie file' that is widely used by the web browsers. In other implementations, it can be stored in the form of a token carried by the user. As an illustrative example, the 'know-me' package can be stored in the SIM card or the USIM card inside the mobile phone, a smart-card carried by the user himself, or any memory devices that can store data persistently. With the user's permission, he can share his 'know-me' package with his friends, a user community, or to a shopping site so that others can understand his emotional preferences.

Enterprise System (91)

Merchandisers or other service providers have keen interest in knowing the consumer preferences and latest trends. Hence, the computerized emotional profiling system (35) can send an Insight package to those enterprise systems (91) whose owners subscribe to this service. The Insight package stores the analyzed results of the consumer surveys for at least one domain, a plurality of representative multimedia objects, each of which representing a broad category of human emotion and is tagged with emotional codes or visual DNA, and other relevant information. In one implementation, representative multimedia objects are chosen by an expert. As an illustrative example, one multimedia object may be chosen to represent 'happiness' while another one represents 'sadness', . . . , etc. When a consumer is willing to reveal his emotional code, the merchandiser or other service providers can select those products or services in his catalog that appeals to that emotional code. To do so, the merchandiser or other service providers need to tag his products or services with the same set of emotional codes. This can be done by an emotional code auto-tagger system. This system is similar to the auto image tagger module described previously except that the latter tags images with keywords while the emotional code auto-tagger tags images with emotional code.

In operation, an entity multimedia object of a product or service offered by the merchandiser or other service providers is first created. In a preferred implementation, both the entity multimedia object and the representative multimedia objects are digital images or visual objects. The user interface of the emotional code auto-tagger is the same as shown in FIG. 7a and FIG. 7b. The tagged image panel (160) is filled with a plurality of representative multimedia objects, each of which is tagged with at least one emotional code or visual DNA, while the untagged image panel (158) is filled with the entity multimedia objects that represent the merchandiser's products or services. The merchandiser can then drag an image from the untagged image panel (158) onto one of the images in the tagged image panel (160) as mentioned before, and in so doing, the entity multimedia object will inherit the emotional code from that representative multimedia object.

Search and Match Engine (92)

As mentioned previously, the emotional code or Visual DNA can be used as a universal code by both the consumers and the merchandisers. The consumer can use this code to express his emotional preference while the merchandisers can segment his products or services according to this code.

In a traditional on-line shopping site, a consumer visiting the site will typically enter a few keywords on what he wants, and a search engine at this site will search the product or service catalog and display a plurality of choices for the consumer to select. Unfortunately, many recommendations may not match what the consumer wants, resulting in waste of time for the consumer and loss of sales opportunities to the merchandisers. The search and match engine (92) can incorporate the search engine optimization module (46) from the computerized emotional profiling server (36) so that it can make use of the universal Visual DNA to weed out the irrelevant choices, thus providing a more pleasant and favorable shopping experience to the consumer. The actual operation of this system is illustrated by way of an example in the following paragraphs:

In a specific example and refer back to FIG. 1, a consumer uses a web browser available at his end-user system (93) to visit an on-line commerce system that is equipped with a search and match engine (92). The commerce system, in turn, receives product and service catalog from an enterprise system (91) of a furniture store. In this case, each of the furniture (i.e., a sofa) is represented by a multimedia object in the form of an image that has already been tagged with at least one emotional code as described previously. The consumer's 'know-me' package (which contains the consumer's Visual DNA) is stored at his end-user system (93) in the form of the 'cookie file' that can be accessed by the web browser.

Figure 8A:
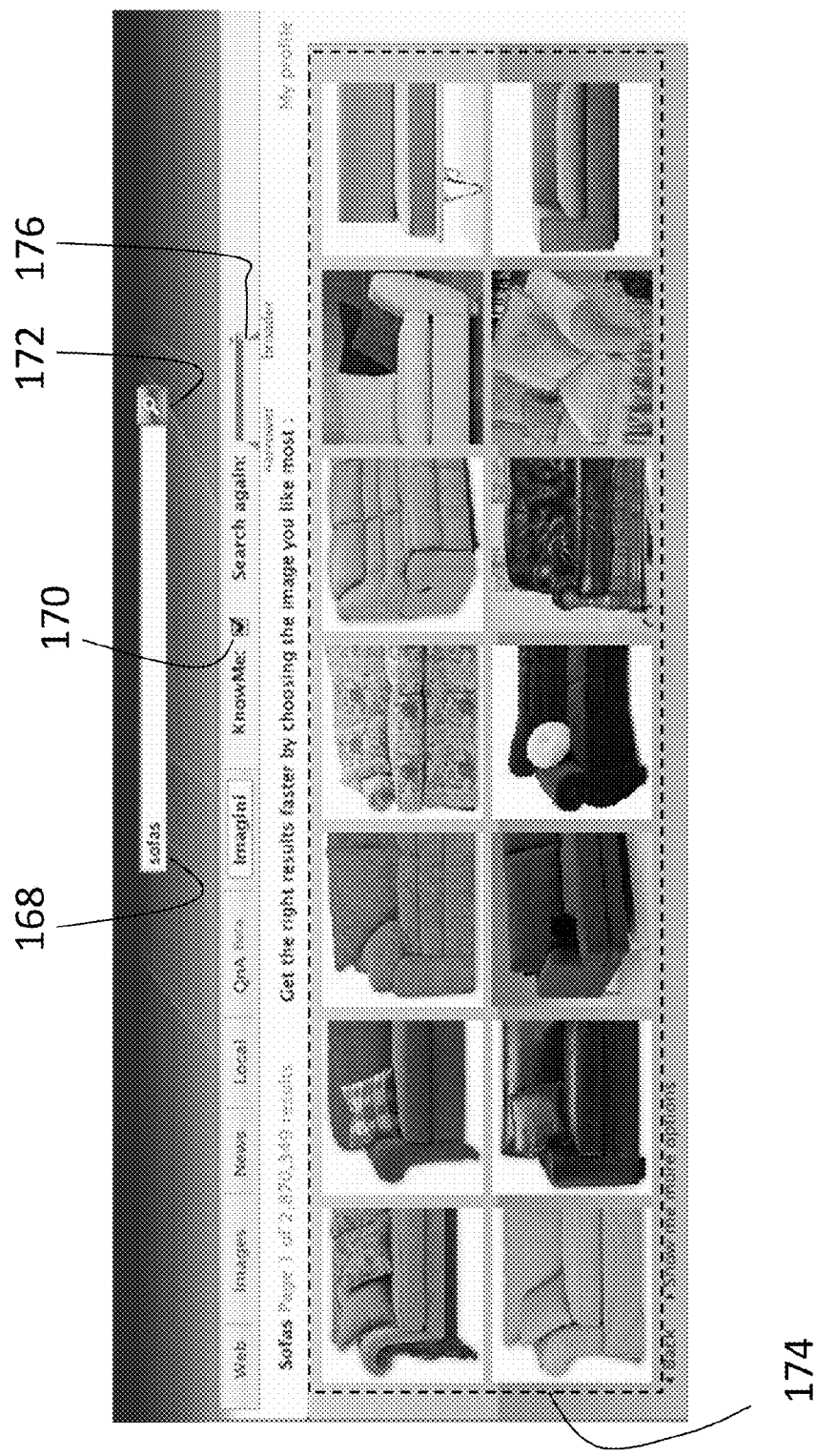
FIG. 8a shows a specific example of user interface of the search engine with a diverse range of results
Figure 8B:
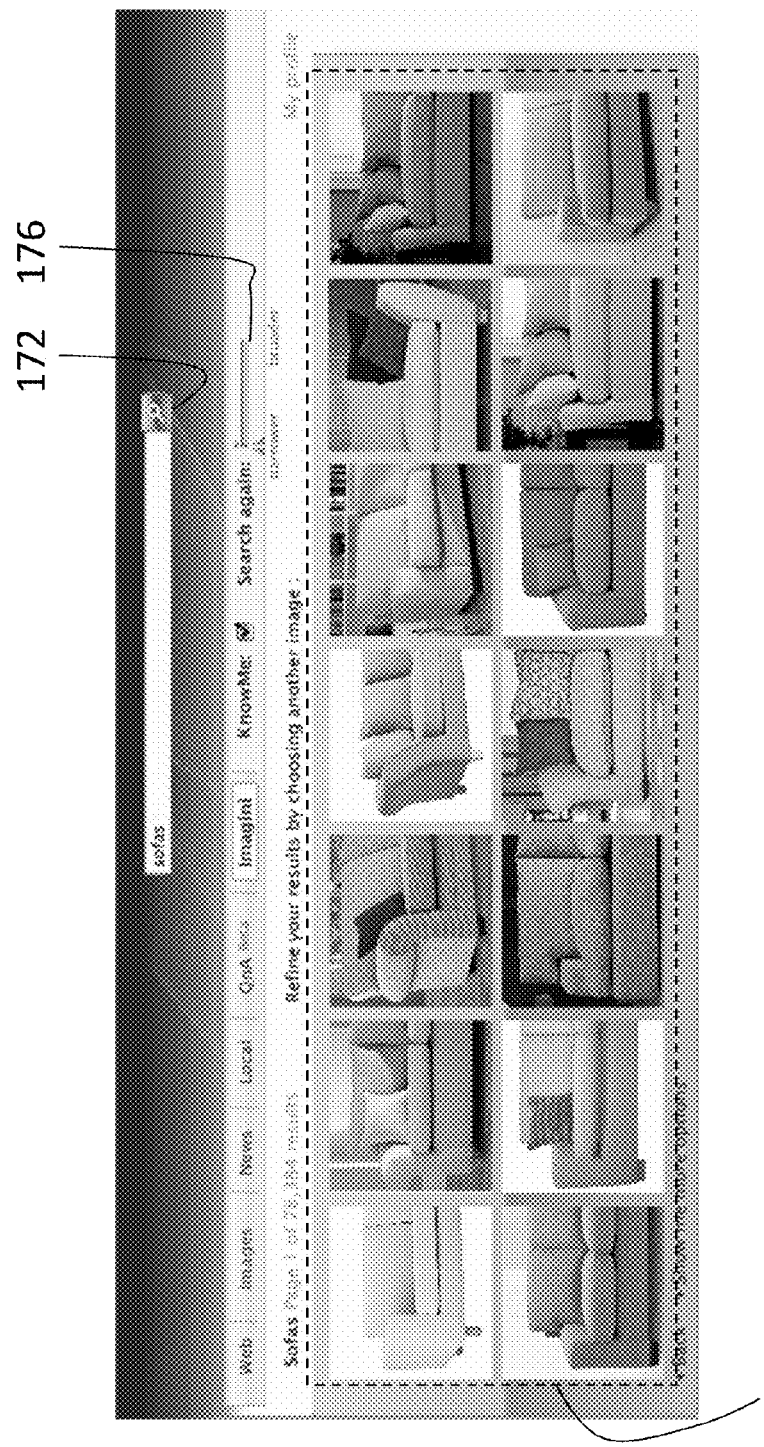
FIG. 8b shows a specific example of user interface of the search engine with a more homogeneous range of results

FIG. 8a is an illustrative example of the screen shot when the consumer first enters the aforementioned on-line commerce site. The user only needs to input the word "sofas" as search string into the input box (168), and a plurality of sofa images are displayed in the display box (174). If the user is willing to provide his 'know-me' to the furniture site, which is necessary for Visual DNA matching, he can click the 'know-me' check box (170). This will cause the web browser to send the consumer's 'know-me' cookie file to the on-line commerce site. Failure to do so would result in the search engine behaving like an ordinary text-based one without optimization. After the user checked the 'know-me' box and clicks the "search" button (172) again, another plurality of sofa images appears on the display box (174). A sliding bar (176) on top of the page becomes enabled too. At this stage the sliding bar (176) is placed on the rightmost or broadest position, which means that the search engine returns a set of items with broadest diversity relative to the consumer's Visual DNA. The sofas thus selected are showed in the display box (174) of FIG. 8a. As one can see, they vary greatly in the style and structure. Whereas in FIG. 8b, when the sliding bar (176) is positioned at leftmost or narrowest position, the sofas shown in the display box (174) are quite similar in style and structure to each other since they are selected with smallest diversity relative to the consumer's Visual DNA. Therefore, the consumer does not need to specify his search string with detailed textual description of his preference but instead use the sliding bar (176) to adjust the proximities of search results according to his emotional preference. The advantages of this search optimization are that not only is it fast and accurate, but it also saves the effort for the user to literately input every aspect of his preference to the search string, which is inefficient and time consuming.

Behind the scene, the search engine optimization module that is embedded to search and match engine (92) of the commerce system uses the consumer's Visual DNA code to define a 'peripheral region' according to the sliding bar settings in the consumer's browser. If the setting is broadest, the peripheral region is set to be wider, and the commerce system (92) chooses product or service items from its catalog from that wider peripheral region. Hence the selected items will have a more diverse styles or structures among one another. When the setting is narrowest, the peripheral region becomes smaller; hence the items selected will be more homogenous.

One specific implementation of this peripheral region is disclosed as follows. When statistical clustering analysis is used, the clustering algorithm produces one or more cluster centers. Each center is associated with its statistical mean and variance. The cluster center can be used as one of the component of the emotional code or Visual DNA. In this setting, the peripheral region is the region centered at the cluster mean, with its extent or radius proportional to the cluster variance. Hence a wide peripheral region corresponds to a bigger proportional constant so that when this constant multiplies the cluster variance, it yields a bigger radius that defines a bigger peripheral region area. Conversely, a narrow peripheral region corresponds to a smaller proportional constant, yielding a smaller coverage area. And the items selected will be closer to the cluster mean and hence more homogeneous.

As the consumer may not take part in all the surveys covering all domains, the visual DNA on those domains with no survey data may not be available (the missing data problem). One way to overcome this problem is to check the category that this consumer belongs to, and find out for each of those missing domain areas, what visual DNA code do most of the users in that category belong to, and assign that visual DNA code to this consumer as an initial guess. As a specific example, the consumer may only answer the survey on sport, but not the vacation domain. So he has visual DNA code for sport (i.e. he likes 'winter sport'). The analysis result shows that most people who like winter sport would like to go to a skiing resort for vacation. So he is assigned to a visual DNA code of 'skiing resort' in the vacation category, even though there is no survey data on 'vacation' for him. When this consumer pays multiple visits to one or more vacation sites, the vacation products or services that this consumer selected will be sent back to the computerized emotional profiling server (35) in the form of 'click-through' data via data communication channel (23c). The later can invoke the analysis module (44) to analyze this click through data to get a more accurate emotional profile about this consumer on this vacation domain. This may result in a new Visual DNA code for this consumer and will pass back to the consumer in the form of a new know-me package.

Hardware and Software Implementation Details

Figure 9:
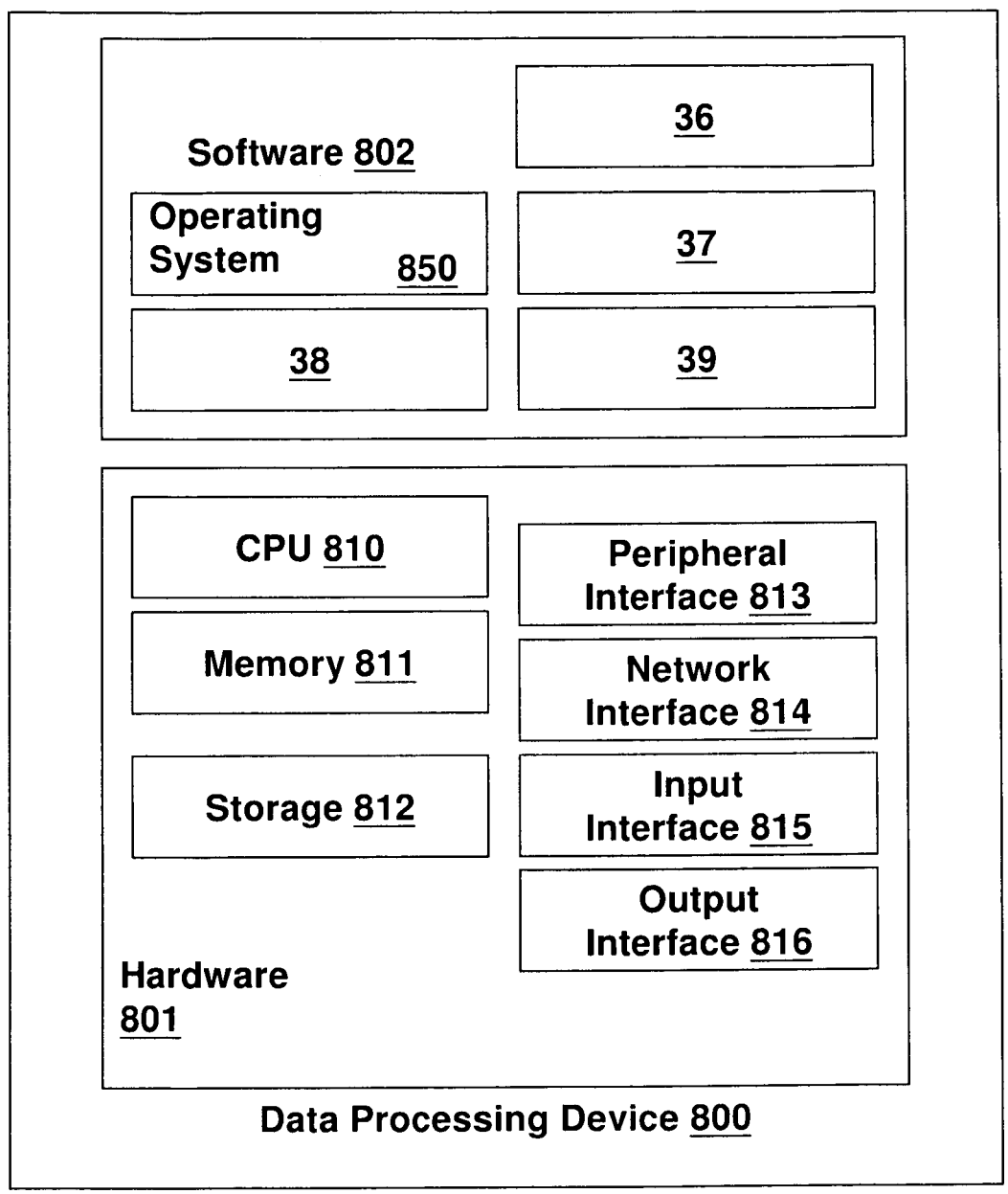
FIG. 9 shows a specific example of the internal architecture of the hardware and software system of the matching system.

The system block diagram shown in FIG. 1 depicts one embodiment of the present invention which employs distributed computing architecture, where the profiling server (35), the enterprise system (91), the search and match engine (92) and end-user system (93) are physically located apart from each other. Each of these systems can be a data processing system (800) as shown in FIG. 9. This system (800) consisting of both the hardware (801) and software components (802) that can be used to implement the embodiment of the present invention. The hardware components further comprises a Central Processing Unit (CPU) (810), memory (811), storage (812), and multiple interfaces such as the peripheral interface (813), network interface (814), input interface (815) and output interface (816).

CPU (810) can be a single microprocessor or multiple processors combined together. Memory (811) can include read-only memory, random-access memory or other memory technologies, singly or jointly combined. Storage (812) typically includes persistence storage such as magnetic hard disk, floppy disk, optical storage devices such as CD-ROM, and semiconductor storage devices such as flash memory cards, or other storage technologies, singly or in combination. Network interface (814) enables the data processing device (800) to exchange information with the external data communication network such as the Personal Area Network (PAN), the Local Area Network (LAN), the Wide Area Network (WAN), the Internet, and other data communication network architectures, upon which the data communication channel is established. The network interface (814) can include the Ethernet interface, the Wireless LAN interface device, the Bluetooth interfacing device and other networking devices, singly or in combination.

Software (802) further includes the operating system (850), and one or more software implementations of those systems in FIG. 1.

It should be understood for those skilled in the art that the division between hardware and software is a conceptual division for ease of understanding and is somewhat arbitrary. Furthermore, the application software systems may be executed in a distributed computing environment. The software program and its related databases can be stored in a separate file server or database server and are transferred to the local host for execution. The data processing device (800) as shown in FIG. 9 is therefore an exemplary embodiment of how it can be implemented. Those skilled in the art will appreciate that alternative embodiments can be adopted to implement the present invention.

The preferred embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, in the system block diagram shown in FIG. 1, the enterprise system (91) may host its own search and match engine (92) so both subsystems can be run on a single computer. It is clear, however, that the computerized emotional profiling server (35) may also host the search and match engine for other merchandisers to use. In other cases, the end user may not have a powerful computing device to act as the end-user system (93). In that case, the profile server (35), upon receiving instruction from the user, can directly send the 'know-me' package to the search and match engine (92).

Hence, it is clear to one skilled in the art that one or more subsystems can be co-located in a single computer system. The block diagram in FIG. 1 teaches a flexible framework on how the emotional profiling system (22) can be implemented. Any variation of implementation based on the teaching of this framework will therefore also fall into the scope of this invention.

In addition, it is clear to those skilled in the art that there are many ways to interconnect the computerized emotional profiling server (35) to many different kinds of computing devices that the user or designer use. For example, the computing device can be but not limited to an information kiosk, a personal computer, desk-top computer, lap-top computer, palm-top, PDA, data-tablet, smart-phone, interactive TV, Internet TV or any other devices that can prompt the user a message and solicit a response from them and can also be connected to the data communication channel. The data communication network can be but not limited to the Internet (25), a cellular wireless network, a wired local area network (LAN), a wireless LAN, wired or wireless metropolitan area networks, or any combination of the above.

Moreover, the search engine optimization system (46) may be implemented as a downloadable module to be installed in a third party computer system as a specialized search engine. For example, it can replace the traditional search engine of an on-line shopping site.

In FIG. 5, a specific example of the user interface when the user is responding to the survey is disclosed. Although only a positive response and a negative response are shown in this figure, it is obvious for those skilled in the art that other kinds of responses could be displayed for the user to choose. For example, a "don't know" option can be added together with a text-box for him to enter his comments.

The keyword analysis method that assigns an emotional code to a user described above is preferably done by automatic process that mimics a human expert's reasoning and decision making process. While expert system and neural network approaches have been mentioned previously, other Artificial Intelligent technologies can also be used. These include but not limited to biologically-inspired computing, fuzzy logic, or commonsense reasoning. Those skilled in the art can also adopt other Artificial Intelligence techniques based on the teaching of this invention to develop other automated methods.

While the aforementioned paragraphs use on-line furniture shopping scenario to teach how the emotional code or Visual DNA can be used to overcome the limitations of the traditional search engines, the underlining invention can be applied to encompass many other scenarios. Hence, instead of a consumer searching the products or services of an on-line site, the emotional profiling system (22) can be generalized to retrieving, searching or matching operations between two entities, where an entity can be a user, a product, or a service as mentioned in the first paragraph in the detailed description section. In one such scenario, the emotional profiling system (22) may be configured for a search entity to find a list of database entities that have similar emotional code. When both the search and the database entities are human beings, the system matches people with similar emotional profile. When the search entity is a product or service from a merchandiser, and the database entities are human users, then it is a direct marketing application. When both the search and database entities are either products or services, then the system can identify a suite of offerings for users having a particular Visual DNA code. Similarly, the same situation applies in matching application whereby the system will return a list of database entities that matches exactly the same emotional code of a match entity.

In addition, while an e-commerce scenario is given here, the emotional profiling system (22) can actually be applied to much broader areas—between an information seeker and an information provider, where the latter can be a government institution, a public library, or any other similar organizations. When all the entities are tagged with the Visual DNA code, this code becomes a universal, machine readable language that codifies human emotion. Those skilled in the art can make use of this code, and the teaching disclosed in this invention to make existing search and match operation much more efficient.

The invention claimed is:

1. A method of filtering irrelevant items from a search operation using machine-readable emotional codes between a search entity and a plurality of database entities, wherein the search entity has an emotional code associated therewith, said method comprising the steps of:
   (a) capturing emotional preferences from a plurality of users, said emotional preferences captured when each user selects at least one multimedia object from a plurality of multimedia objects, wherein each multimedia object represents an entity;
   (b) generating emotional codes from said emotional preferences captured from said plurality of users;
   (c) assigning at least one of said emotional codes to each of said database entities;
   (d) obtaining said search entity from an operator who conducts said search operation on a first computer;
   (e) using said emotional code associated with the search entity to define a peripheral region;
   (f) connecting to a database on a second computer that comprises said plurality of database entities;
   (g) retrieving a plurality of matched database entities, each of said matched database entities having an emotional code falling within said peripheral region; and
   (h) presenting said plurality of matched database entities to said operator.

2. The method according to claim 1 wherein said first computer and said second computer are the same computer.

3. The method according to claim 1, wherein said search entity emotional code is associated with a cluster comprising a cluster mean and a cluster variance, and said peripheral region is centered at said cluster mean and having a radius of said cluster variance multiplied by a proportional constant.

4. The method according to claim 3, wherein said radius of said peripheral region is user-selectable by moving a cursor on a display screen of said first computer along a sliding bar between a first end and an opposed second end on said screen, wherein said first end of said sliding bar means a larger radius that corresponds to a larger peripheral region, while said second end of said sliding bar means a smaller radius that corresponds to a smaller peripheral region.

5. The method according to claim 1, wherein said search entity emotional code is stored at said first computer system in the form of a cookie file that can be accessed by a web browser.

6. The method according to claim 5, wherein said search entity has an authority to enable or not enable said cookie file to be accessible.

7. The method according to claim 1, wherein said emotional code comprises a plurality of emotional code segments, each said emotional code segment corresponding to a unique domain, said method further comprising the steps of:
   identifying at least one domain that is relevant to said search operation; and
   checking if said emotional code segment in said at least one domain is present in said search entity emotional code;
   wherein if at least one said emotional code segment in said at least one domain is checked to be absent, an emotional code segment is assigned to said corresponding domain of said search entity according to said search entity's category.

8. The method according to claim 7, wherein said emotional code segment assigned to said corresponding domain of said search entity is the most popular emotional code segment in said search entity's category.

9. The method according to claim 1, wherein said search entity and each said database entity is a consumer, a product or a service.

10. A method of filtering irrelevant items from a match operation using machine-readable emotional codes between a match entity and a plurality of database entities, wherein the match entity has an emotional code associated therewith, said method comprising the steps of:
    (a) capturing emotional preferences from a plurality of users, said emotional preferences captured when each user selects at least one multimedia object from a plurality of multimedia objects, wherein each multimedia object represents an entity;
    (b) generating emotional codes from said emotional preferences captured from said plurality of users;
    (c) assigning at least one of said emotional codes to each of said database entities;
    (d) obtaining said match entity from an operator who conducts said match operation on a first computer;
    (e) connecting to a database on a second computer that comprises said plurality of database entities;
    (f) retrieving a plurality of matched database entities, each said matched database entity having an emotional code identical to the emotional code associated with the match entity; and
    (g) presenting said plurality of matched database entities to said operator.

11. The method according to claim 10, wherein said match entity emotional code is stored at said match entity's system in the form of a cookie file that can be accessed by a web browser.

12. The method according to claim 11, wherein said match entity has an authority to enable or not enable said cookie file to be accessible.

13. The method according to claim 10, wherein said emotional code comprises a plurality of emotional code segments, each said emotional code segment corresponding to a unique domain, said method further comprising the steps of:
    identifying at least one domain that is relevant to said match operation; and
    checking if said emotional code segment in said at least one domain is present in said match entity emotional code;
    wherein if at least one said emotional code segment in said at least one domain is checked to be absent, an emotional code segment is assigned to said corresponding domain of said match entity according to said match entity's category.

14. The method according to claim 13, wherein said emotional code segment assigned to said corresponding domain of said match entity is a most popular emotional code segment in said match entity's category.

15. The method according to claim 10, wherein said match entity and each said database entity is a consumer, a product or a service.

16. A system for filtering irrelevant items using machine-readable emotional codes from a plurality of database entities, comprising:

(a) a profiling server configured to capture emotional preferences from a plurality of users, said emotional preferences captured when each user selects at least one multimedia object from a plurality of multimedia objects, wherein each multimedia object represents an entity; and generate said emotional codes from said emotional preferences captured from said plurality of users;

(b) a first computer, said first computer comprising a display; and (c) a second computer, said second computer comprising a database, said database comprising a plurality of database entities, each of said database entities being associated with at least one of said emotional codes;

wherein an operator defines a search entity to be compared against said plurality of database entities in said second computer, said comparison done in a third computer, said comparison compares an emotional code of said search entity and said plurality of database entities and presents the database entities having an emotional code that lies within a peripheral region of the emotional code of said search entity to said operator on said first computer.

17. The system according to claim 16, wherein a size of said peripheral region is selectable by said operator by moving a cursor along a sliding bar on said display of said first computer, a first end of said sliding bar corresponds to a larger peripheral region and an opposed end of said sliding bar corresponds to a smaller peripheral region.

18. The system according to claim 16, wherein said database entities and said search entity is a user, a product or a service.

19. The system according to claim 16, wherein said first computer and said third computer are the same computer.

20. The system according to claim 16, wherein said display further comprises a text box for entering textual criteria for said filtering system.

* * * * *